United States Patent
Yi et al.

(10) Patent No.: US 10,080,332 B1
(45) Date of Patent: Sep. 25, 2018

(54) SELF-SEALING DRIPPER APPARATUS

(71) Applicant: Bright Agrotech, Inc., Laramie, WY (US)

(72) Inventors: Lim Jing Yi, Singapore (SG); Nathaniel R. Storey, Laramie, WY (US)

(73) Assignee: MJNN, LLC, South San Francisco, CA (US)

( * ) Notice: Subject to any disclaimer, the term of this patent is extended or adjusted under 35 U.S.C. 154(b) by 18 days.

(21) Appl. No.: 15/659,676

(22) Filed: Jul. 26, 2017

Related U.S. Application Data

(60) Provisional application No. 62/368,780, filed on Jul. 29, 2016.

(51) Int. Cl.
*A01G 25/00* (2006.01)
*A01G 25/02* (2006.01)

(52) U.S. Cl.
CPC ...... *A01G 25/023* (2013.01); *A01G 2025/006* (2013.01)

(58) Field of Classification Search
CPC ........ A01G 2025/003; A01G 2025/006; A01G 25/02; A01G 25/023; A01G 25/026; B65D 47/242
USPC ............... 239/542; 251/94, 172; 47/79, 48.5
See application file for complete search history.

(56) References Cited

U.S. PATENT DOCUMENTS

| | | | | | |
|---|---|---|---|---|---|
| 473,672 | A | * | 4/1892 | Schrader | B65D 47/242 137/223 |
| 484,509 | A | * | 10/1892 | Schrader | B65D 47/242 222/520 |
| 495,064 | A | * | 4/1893 | Schrader | F16K 1/00 251/340 |
| 1,050,942 | A | * | 1/1913 | Haas | F16L 29/00 137/231 |
| 1,347,795 | A | * | 7/1920 | Schrader | F02M 23/09 137/480 |
| 2,790,403 | A | * | 4/1957 | Larsen | A01G 25/02 111/7.1 |

(Continued)

OTHER PUBLICATIONS

Schrader Valve example, May 21, 2008.*

*Primary Examiner* — Viet Le
(74) *Attorney, Agent, or Firm* — Patent Law Office of David G. Beck

(57) ABSTRACT

A self-sealing dripper apparatus for controlling liquid flow from a main irrigation pipe is provided. The dripper apparatus comprises a dripper base having an attachment end and an open end with the attachment end capable of being releasably connected to the liquid carrying pipe and the attachment end fluidly connected to the open end. A hollow piston casing is provided having a first open end and a second open end with the first open end positionable over the open end of the dripper base. A piston is slidably movable within the piston casing with the piston having a first end and a second end. Upon fluid flowing from the main irrigation pipe, the fluid forces the second end of the piston against the second open end of the piston casing thereby sealing the second open end of the piston casing. Upon overcoming the force of the fluid flowing from the main irrigation pipe, the second end of the piston separates from the second open end of the piston housing allowing fluid to flow through the second open end of the piston casing.

13 Claims, 3 Drawing Sheets

(56) References Cited

U.S. PATENT DOCUMENTS

| | | | | |
|---|---|---|---|---|
| 2,960,831 A * | 11/1960 | Lonaberger | | E02D 3/12 |
| | | | | 111/7.1 |
| 3,200,839 A * | 8/1965 | Gallagher | | F16K 1/46 |
| | | | | 137/516.29 |
| 3,397,541 A * | 8/1968 | Kersh | | A01G 25/06 |
| | | | | 239/271 |
| 3,693,888 A * | 9/1972 | Rondas | | A01G 25/023 |
| | | | | 137/513.3 |
| 3,727,952 A * | 4/1973 | Richardson | | F16L 17/00 |
| | | | | 251/149.1 |
| 3,742,701 A * | 7/1973 | Feemster | | F02K 9/52 |
| | | | | 137/542 |
| 3,777,980 A * | 12/1973 | Allport | | A01G 25/023 |
| | | | | 239/272 |
| 3,841,349 A * | 10/1974 | Todd | | A01G 25/023 |
| | | | | 137/513.5 |
| 3,974,853 A * | 8/1976 | Bentley | | A01G 25/023 |
| | | | | 137/503 |
| 4,084,749 A * | 4/1978 | Drori | | A01G 25/023 |
| | | | | 239/271 |
| 4,288,035 A * | 9/1981 | Rosenberg | | F16K 21/02 |
| | | | | 239/271 |
| 4,483,360 A * | 11/1984 | Knappe | | F16K 1/446 |
| | | | | 134/166 C |
| 4,546,796 A * | 10/1985 | Bourquin | | F02C 7/228 |
| | | | | 137/625.3 |
| 4,605,346 A * | 8/1986 | Trevarrow | | B23B 29/03478 |
| | | | | 408/147 |
| 4,653,695 A * | 3/1987 | Eckstein | | A01G 25/023 |
| | | | | 239/542 |
| 4,796,660 A * | 1/1989 | Bron | | A61M 5/16881 |
| | | | | 137/504 |
| 4,951,501 A * | 8/1990 | MacAnally | | B60C 23/04 |
| | | | | 137/227 |
| 4,964,544 A * | 10/1990 | Hanna | | A47K 5/1207 |
| | | | | 137/859 |
| 5,026,021 A * | 6/1991 | Pino | | F16K 21/10 |
| | | | | 251/114 |
| 5,190,072 A * | 3/1993 | McAnally | | F16K 17/04 |
| | | | | 137/454.5 |
| 5,201,605 A * | 4/1993 | Lang | | A01G 29/00 |
| | | | | 137/78.3 |
| 5,295,504 A * | 3/1994 | Riquier | | B60C 23/0496 |
| | | | | 137/230 |
| 5,477,883 A * | 12/1995 | Totten | | B65D 77/067 |
| | | | | 137/614.03 |
| 5,823,435 A * | 10/1998 | Morgan | | B05B 1/323 |
| | | | | 239/107 |
| 5,887,762 A * | 3/1999 | Hanna | | B67D 1/102 |
| | | | | 222/251 |
| 5,931,389 A * | 8/1999 | Clavel | | A01G 25/023 |
| | | | | 239/533.13 |
| 6,068,022 A * | 5/2000 | Schultz | | F02M 37/025 |
| | | | | 137/538 |
| 6,076,544 A * | 6/2000 | Pierce | | F16L 37/18 |
| | | | | 137/223 |
| 6,192,945 B1 * | 2/2001 | Ford | | G01N 1/312 |
| | | | | 141/2 |
| 6,367,714 B1 * | 4/2002 | Smoot | | A01M 21/043 |
| | | | | 239/288 |
| 7,004,658 B2 * | 2/2006 | Hall | | A47L 13/257 |
| | | | | 401/136 |
| 7,614,528 B2 * | 11/2009 | Jeong | | B67D 3/02 |
| | | | | 222/438 |
| 8,087,642 B2 * | 1/2012 | Lucas | | F16K 1/303 |
| | | | | 251/149.1 |
| 8,313,008 B2 * | 11/2012 | Ciavarella | | A47K 5/14 |
| | | | | 222/135 |
| 8,371,325 B1 * | 2/2013 | Grizzle | | F16K 31/12 |
| | | | | 137/78.3 |
| 8,496,193 B2 * | 7/2013 | Rosenberg | | A01G 25/023 |
| | | | | 239/542 |
| 8,662,360 B2 * | 3/2014 | Yuan | | B65D 47/2068 |
| | | | | 222/491 |
| 8,726,476 B2 * | 5/2014 | Renaker | | B60C 25/18 |
| | | | | 29/221.5 |
| 9,328,836 B2 * | 5/2016 | Schultz | | F16K 17/06 |
| 9,578,996 B2 * | 2/2017 | Harris | | A47K 5/1211 |
| 9,648,990 B1 * | 5/2017 | Corney | | A47K 5/1211 |
| 2002/0047053 A1 * | 4/2002 | Bron | | G05D 16/0647 |
| | | | | 239/542 |
| 2003/0001029 A1 * | 1/2003 | Neyestani | | A01G 25/023 |
| | | | | 239/542 |
| 2005/0269429 A1 * | 12/2005 | Theron | | B05B 3/00 |
| | | | | 239/542 |
| 2007/0282264 A1 * | 12/2007 | Shekalim | | A01G 25/02 |
| | | | | 604/131 |
| 2010/0012532 A1 * | 1/2010 | Frutin | | B65D 47/242 |
| | | | | 206/221 |
| 2010/0237170 A1 * | 9/2010 | Rosenberg | | A01G 25/023 |
| | | | | 239/106 |
| 2011/0006077 A1 * | 1/2011 | Peterson | | B65D 35/34 |
| | | | | 222/99 |
| 2012/0181357 A1 * | 7/2012 | Zhu | | A01G 25/02 |
| | | | | 239/575 |
| 2012/0187157 A1 * | 7/2012 | Yuan | | B65D 47/242 |
| | | | | 222/496 |
| 2013/0284765 A1 * | 10/2013 | Szekely | | A47K 5/1201 |
| | | | | 222/322 |
| 2014/0252103 A1 * | 9/2014 | Hamann | | B05B 12/04 |
| | | | | 239/1 |
| 2014/0263758 A1 * | 9/2014 | Turk | | A01G 25/023 |
| | | | | 239/542 |
| 2017/0066640 A1 * | 3/2017 | Rumigny | | B65D 81/3227 |
| 2017/0332566 A1 * | 11/2017 | Emory | | A01G 25/167 |

* cited by examiner

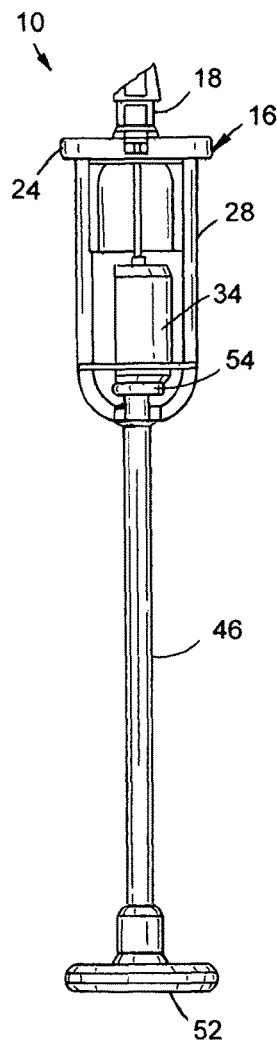
FIG.1
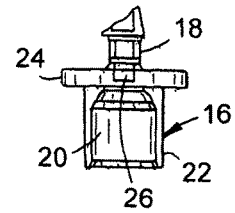
FIG.2
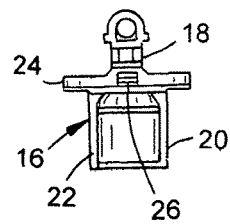
FIG.3
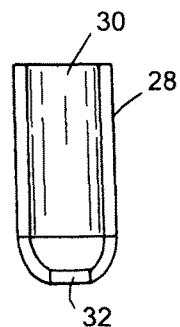
FIG.4
54 ⌐
FIG.5

SELF-SEALING DRIPPER APPARATUS

The present application claims benefit of priority from U.S. provisional patent application Ser. No. 62/368,780, filed Jul. 29, 2016, entitled "Self-Sealing Dripper Apparatus".

BACKGROUND OF THE INVENTION

1. Field of the Invention

The present invention relates to an improved method and device for use in controlling liquid flow from low pressure liquid carrying pipes, and more particularly, the present invention relates to a self-sealing dripper apparatus manufactured with a barbed or other means of attachment to the pipe.

2. Description of the Prior Art

In arid climates, where rain cannot be relied upon, irrigation is required. Sprinkler systems are inefficient as much of the water evaporates off leaves and the ground and does not get absorbed by the roots. Furthermore, sprinklers tend to cause shallow rooting, whereas, it is generally preferable for plants to grow deep roots.

It has long been appreciated that drip irrigation is the most ecologically friendly type of irrigation in that water can be supplied in near optimal amounts, exactly where needed. Preferably, drippers are situated a few centimeters from seedlings, to challenge the roots, causing them to grow towards the moisture; it also being appreciated that too much moisture can cause roots to rot. The depth of penetration is dependent on soil type, humidity and plant cover. Nevertheless, in general, drippers tend to result in wetting in a deep, conical pattern around the dripper, which aids the growth of strong roots.

Whereas it is relatively easy to control the amount of water supplied via a conduit as a whole, it is not generally possible to vary the output of individual drippers along a common conduit. In some applications this would be desirable. Currently, solid-rich systems and biologically active irrigation water causes clogs that can only be corrected by disassembly of the dripper body, sterilization, etc. Additionally, drippers are not self-sealing leading to wasted water, cost, and production inefficiencies for horticultural crop producers.

SUMMARY

The self-sealing dripper apparatus of the present invention is embodied in a device formed by a dripper base, piston casing, piston, optional O ring and optional external weight and liquid distributor. When the piston is moved down, either by gravity or liquid pressure, the dripper is sealed and is in the "off" mode. When the piston is moved up, either by manual manipulation or placement of something under the piston spindle to "lift" it, the dripper allows water flow and is in the "on" mode. The preferable main material incorporated in the dripper apparatus is a plastic material. Suitability of using other materials, such as metals, should be determined by the operating environment.

The present is a self-sealing dripper apparatus for controlling liquid flow from a main irrigation pipe. The self-sealing dripper apparatus comprises a dripper base having an attachment end and an open end with the attachment end capable of being releasably connected to the liquid carrying pipe and the attachment end fluidly connected to the open end. A hollow piston casing has a first open end and a second open end with the first open end positionable over the open end of the dripper base. A piston is slidably movable within the piston casing with the piston having a first end and a second end. Upon fluid flowing from the main irrigation pipe, the fluid forces the second end of the piston against the second open end of the piston casing thereby sealing the second open end of the piston casing. Upon overcoming the force of the fluid flowing from the main irrigation pipe, the second end of the piston separates from the second open end of the piston housing allowing fluid to flow through the second open end of the piston casing.

In addition, the present invention includes a method for controlling liquid flow from a main irrigation pipe. The method comprises providing a dripper base having an attachment end and an open end, releasably connecting the attachment end to the liquid carrying pipe, fluidly connecting the attachment end to the open end, providing a hollow piston casing having a first open end and a second open end, positioning the first open end over the open end of the dripper base, slidably positioning a piston within the piston casing, the piston having a first end and a second end, introducing fluid from the main irrigation pipe into the piston casing, forcing the second end of the piston against the second open end of the piston casing, sealing the second open end of the piston casing, overcoming the force of the fluid flowing from the main irrigation pipe, separating the second end of the piston from the second open end of the piston housing, and allowing fluid to flow through the second open end of the piston casing.

The present invention further includes a self-sealing dripper apparatus for controlling liquid flow from a main irrigation pipe. The self-sealing dripper apparatus comprises a dripper base having an attachment end and an open end with the attachment end capable of being releasably connected to the liquid carrying pipe and the attachment end fluidly connected to the open end. A hollow piston casing is provided having a first open end and a second open end with the first open end positionable over the open end of the dripper base. A piston is slidably movable within the piston casing, the piston having a first end and a second end. A central aperture is formed between the attachment end and the open end of the dripper base. An upper spindle is provided having a first end and a second end with the first end of the upper spindle secured to the first end of the piston and the second end of the upper spindle extending at least into the dripper base and the central aperture. A lower spindle is provided having a first end and a second end with the first end of the lower spindle secured to the second end of the piston and the second end of the lower spindle extending through second open end of the piston casing. Upon fluid flowing from the main irrigation pipe, the fluid forces the second end of the piston against the second open end of the piston casing thereby sealing the second open end of the piston casing. Upon overcoming the force of the fluid flowing from the main irrigation pipe, the second end of the piston separates from the second open end of the piston housing allowing fluid to flow through the second open end of the piston casing.

BRIEF DESCRIPTION OF THE DRAWINGS

FIG. 1 is an elevational, sectional side view illustrating a self-sealing dripper apparatus, constructed in accordance with the present invention, showing a dripper base, a piston casing receiving a portion of the dripper base, a piston slidably mounted within the piston casing, an upper spindle extending from one end of the piston, a lower spindle extending from the other end of the piston, an O-ring for promoting sealing of the piston casing, and an external mass secured to the lower spindle;

FIG. 2 is an elevational, sectional side view illustrating the dripper base of the self-sealing dripper apparatus, constructed in accordance with the present invention;

FIG. 3 is an elevational, sectional front view illustrating the dripper base of the self-sealing dripper apparatus of FIG. 2, constructed in accordance with the present invention;

FIG. 4 is an elevational, sectional side view illustrating the piston casing of the self-sealing dripper apparatus, constructed in accordance with the present invention;

FIG. 5 is an elevational side view illustrating the O-ring of the self-sealing dripper apparatus, constructed in accordance with the present invention;

Figure 6:
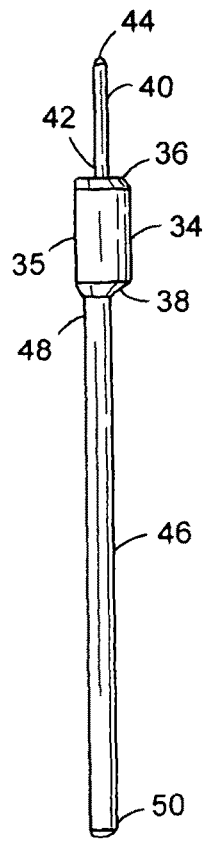
FIG. 6 is an elevational side view illustrating the piston, the upper spindle, and the lower spindle of the self-sealing dripper apparatus, constructed in accordance with the present invention.
Figure 7:
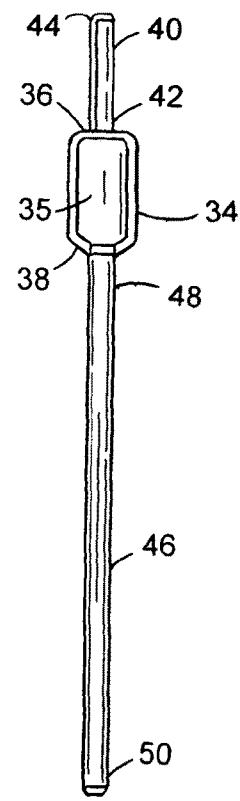
FIG. 7 is an elevational front view illustrating the piston, the upper spindle, and the lower spindle of the self-sealing dripper apparatus of FIG. 6, constructed in accordance with the present invention.
Figure 8:
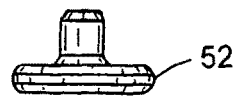
FIG. 8 is an elevational side view illustrating the external mass of the self-sealing dripper apparatus, constructed in accordance with the present invention.
Figure 9:
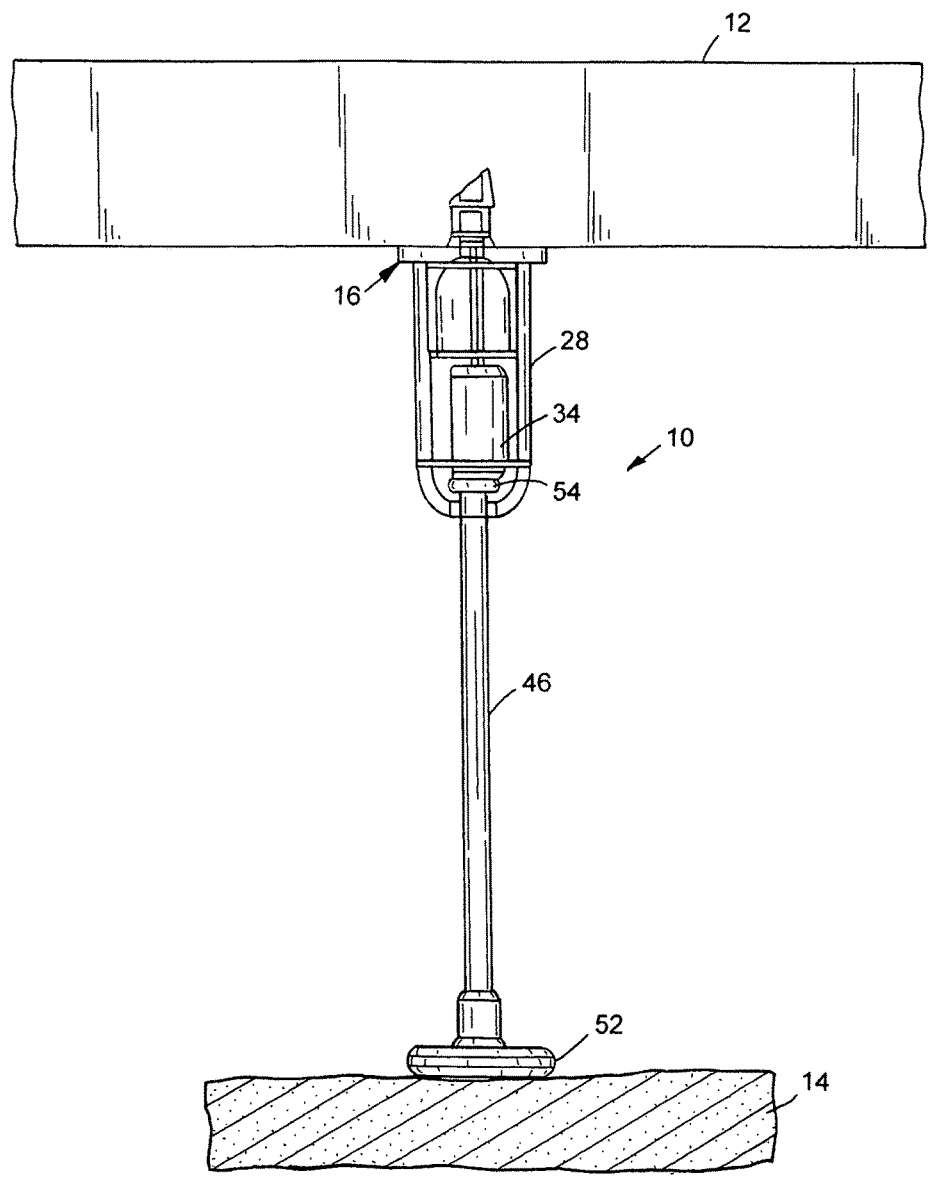
FIG. 9 is an elevational, sectional side view illustrating the self-sealing dripper apparatus, constructed in accordance with the present invention, releasably secured to a main irrigation pipe.

DETAILED DESCRIPTION OF THE
PREFERRED EMBODIMENTS

The present invention is a self-sealing dripper apparatus, indicated generally at 10, for controlling the liquid flow from a main irrigation pipe 12. The purpose of the self-sealing dripper apparatus 10 is to function with vertical farming towers and other applications where the self-sealing dripper apparatus 10 connects to a liquid carrying pipe 12 and needs to be turned on and off depending on whether a pot, tower, or other growing container 14 is placed beneath the self-sealing dripper apparatus 10. Additionally, the self-sealing dripper apparatus 10 allows cleaning and un-clogging in biologically active systems where biofilms and solids can cause problems with dripper clogging.

The self-sealing dripper apparatus of the present invention includes a hollow dripper base 16 having an attachment end 18, and an open end 20, with the open end having an outer surface 22. The attachment end 18 of the dripper base 16 is releasably connectable to the liquid carrying pipe 12 and can be a simple barbed punch or a screw attachment 18. The open end 20 of the dripper base 16 has a substantially full open face or a half open face, for allowing the water flow to be simply controlled by the interaction between it and a piston's upper surface, as will be described in further detail below.

In a preferred embodiment, the dripper base 16 of the self-sealing dripper apparatus 10 of the present invention has a shoulder 24 or stop formed between the attachment end 18 and the open end 20. A central aperture 26 formed in the shoulder 24 allows liquid flow from the liquid carrying pipe 12, through the attachment end 18, and into the open end 20. The function of the shoulder 24 of the dripper base 16 will be described in further detail below.

In addition, the self-sealing dripper apparatus 10 of the present invention includes a hollow piston 28 casing having a first open end 30 and a second open end 32. The first open end 30 is positioned over the open end 20 of the dripper base 16 and interacts with the outer surface 22 of the open end 20 of the dripper base 16 for friction attachment of the piston casing 28 to the dripper base 16. Preferably, the piston casing 28 completely surrounds the complete open end 20 of the dripper base 16 and receives the entire open end 20 of the dripper base 16 with the shoulder 24 formed on the dripper base 16 limiting the extent of the piston casing 28 relative to the dripper base 16 and limiting the extent of the attachment end 18 of the piston casing 16 within the main irrigation pipe 12.

Furthermore, the self-sealing dripper apparatus 10 of the present invention includes the piston 34 slidably movable within the piston casing 28 and the dripper base 16. The piston 34, likewise, is semi-circular, or missing a portion, i.e., having a segmented face 35, of the round cross section of the piston 34 to allow the passage of fluid trough the hollow piston casing 28. The piston 34 has a first end 36 positioned nearingly adjacent the first open end 30 of the piston casing 28 and a second end 38 positioned nearingly adjacent the second open end 32 of the piston casing 16. Preferably, the first end 36, the second end 38, or both, are tapered with the tapering of the second end 38 corresponding to an internally tapered second open end 32 of the piston casing 16 with the internally tapered opening 32 of the piston casing 16 mating with the second end 38 of the piston 34 in an "off" mode, as will be described in further below.

Preferably, as stated, the piston 34 of the self-sealing dripper apparatus 10 of the present invention is semi-circular, or missing a portion of the round cross section, i.e., segmented 35, of the piston to allow the passage of fluid trough the hollow piston casing 28. The circular portion of the piston 34 is similar in diameter to the inside diameter of the hollow piston casing 28 tube and the removed section of the piston 34 allows for liquid flow around the piston 34.

The self-sealing dripper apparatus 10 of the present invention further includes an upper spindle 40 secured to the first end 36 of the piston 34. The upper spindle 40 has a first end 42 and a second end 44 with the first end 42 of the upper spindle 40 secured to the first end 36 of the piston 34 and the second end 44 of the upper spindle 40 extending into the dripper base 16 through the open end 22, through the central aperture 26, and into the attachment end 18. The central aperture 26 acts as a guided for the second end 44 of the upper spindle 40. Preferably, the upper spindle 40 also has a section removed, so that the upper spindle 40 has a cross section that is less than circular, i.e., semi-circular, to allow liquid flow around the upper spindle 40 through the central aperture 26 and when the piston 34 is manipulated (spun or moved up and down) any clogs in the dripper base 16 can be cleared by the interaction of the upper spindle 40 contacting the central aperture 26.

Furthermore, the self-sealing dripper apparatus 10 of the present invention includes a lower spindle 46 secured to the second end 38 of the piston 34. The lower spindle 46 has a first end 48 and a second end 50 with the first end 48 of the lower spindle 46 secured to the second end 38 of the piston 34 and the second end 50 of the lower spindle 46 extending through the second end 32 of the piston casing 28. The lower spindle 46 extends through the second end 32 of the piston casing 28 for variable distances depending on the application. The lower spindle 46 is preferably round and extends through the second end 32 of the piston casing 28 that is of a larger diameter than the cross sectional diameter of the lower spindle 46, allowing water passage when the lower spindle 46 pushes the piston 34 up, but with the second end 38 of the piston 34 sealing the piston casing 28 when the piston 34 drops or lowers in a general direction toward the second open end 32 of the piston casing 28 with the tapered second end 38 of the piston 34 plugging the second open end 32 of the piston casing 28.

In addition, the lower spindle 46 of the self-sealing dripper apparatus 10 of the present invention can be in the form of a complete cylinder or split into a V shape to both provide a natural position in the "off" mode by the tendency of the material to return to its V split. This also removes the need for an optional external mass 52 and liquid distribution attachment, as will be described below, as the shape of the lower spindle 46 will perform the same functions.

The upper spindle 40 of the self-sealing dripper apparatus 10 of the present invention can turn freely in the piston casing 28, as well as the piston 34, with the sectioned portion of both the upper spindle 40 and the piston 34 forming a scraping edge that allows algae, biofilm, and other accumulated detritus to be scraped free of the surfaces of the interior of the self-sealing dripper apparatus 10.

The self-sealing dripper apparatus 10 of the present invention additionally includes an O-ring 54 positioned around the lower spindle 46 against the second end 38 of the piston 34. The O-ring 54 allows the second end 38 of the piston 34 to form a better, high-quality seal against the tapered second open end 32 of the piston casing 28. With or without the O-ring 54, the self-sealing dripper apparatus 10 seals, discontinuing the flow of liquid when a pot, tower or other item 14 pushes the piston 34 up and into the "open" position, and seals the self-sealing dripper apparatus 10 when the item 14 is removed.

Further, the self-sealing dripper apparatus 10 of the present invention includes the external mass 52 mounted to the second end 50 of the lower spindle 46. The external mass 52 provides additional mass for gravity pull and/or to act as a liquid guide to distribute water further. The external mass 54 is preferably attached where a porous, soft or pliable material is placed under the spindle.

Basically, the self-sealing dripper apparatus 10 of the present invention builds on injection molded plastics manufacturing to produce a low cost, effective and low maintenance device for controlling liquid flow. The self-sealing dripper apparatus 10 allows applications where items 14 can be placed and removed below the self-sealing dripper apparatuses 10 and irrigated only when the supporting item or object is present, with the apparatus sealing when the item is removed. This has direct applications to vertical hydroponic applications, unique irrigation applications or applications where sealing is desired when the irrigated item is not present in a designated irrigation area or space.

The economic potential of the self-sealing dripper apparatus 10 of the present invention is related primarily to vertical hydroponic tower producers who want dripper and irrigation systems to self-seal when items or towers are removed from their spots on racks or in growing areas and also are simple and cost effective to clean. However, it is not a stretch of the imagination to envision applications in a variety of agricultural applications involving pots, growing container and similar horticultural applications. The self-sealing dripper apparatus 10 of the present invention has three main parts and an optional attachment for distributing the liquid. In addition, the dripper apparatus provides an easy to install, controllable and hands free method of controlling water flow. With the removal of support for the piston 34, it is naturally forced shut by the water pressure and water flow from the main irrigation line 12 while being easily cleaned of clogs with a simple, one handed twirling action of the main piston 34.

It is the main objective of the self-sealing dripper apparatus 10 of the present invention to provide an improved method and device for controlling water flow from a low pressure liquid carrying pipe, overcoming the current requirements of:
1 Clearing Clogs by:
a. Using an external device e.g. a length of suitably thick wire; and
b. Using two hands, much time and effort to unscrew the cap of pressure compensating drippers, wash the parts and reassemble them.
2 Stopping the entire row of drippers to prevent leaks when removing one dependent device.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A self-sealing dripper apparatus for controlling liquid flow from a liquid carrying pipe, the self-sealing dripper apparatus comprising: a dripper base having an attachment end and an open end, the attachment end capable of being releasably connected to the liquid carrying pipe, the dripper base including an aperture fluidly connecting the attachment end to the open end; a hollow piston casing having a first open end and a second open end, the first open end of the hollow piston casing configured to fit over the open end of the dripper base such that a portion of an inner surface of said hollow piston casing is in contact with a portion of an outer surface of said dripper base; and a piston located within the hollow piston casing, the piston having a first end and a second end, said piston configured to slidably move within the hollow piston casing, wherein liquid flowing from the liquid carrying pipe and through the dripper base forces the second end of the piston against the second open end of the hollow piston casing thereby sealing the second open end of the hollow piston casing, wherein applying sufficient force on the second end of the piston to overcome the force of the liquid flowing from the liquid carrying pipe allows the second end of the piston to separate from the second open end of the hollow piston casing and allow liquid from the liquid carrying pipe to flow through the second open end of the hollow piston casing, wherein the piston is segmented such that a portion of the piston has been removed to allow passage of liquid through the hollow piston casing when the second end of the piston separates from the second open end of the hollow piston casing.

2. The self-sealing dripper apparatus of claim 1 wherein the attachment end of the dripper base is selected from the group consisting of a barbed punch and a screw attachment.

3. The self-sealing dripper apparatus of claim 1 wherein the open end of the dripper base is partially open.

4. The self-sealing dripper apparatus of claim 1, said dripper base further comprising a shoulder formed between the attachment end and the open end of the dripper base.

5. The self-sealing dripper apparatus of claim 4 wherein the hollow piston casing completely surrounds the open end of the dripper base, and wherein the shoulder limits the extent of the piston casing relative to the dripper base.

6. The self-sealing dripper apparatus of claim 1 wherein the hollow piston casing is releasably secured to the dripper base by friction.

7. The self-sealing dripper apparatus of claim 1 wherein the second open end of the hollow piston casing is internally tapered and the second end of the piston is correspondingly tapered allowing the second end of the piston to mate with the second open end of the hollow piston casing.

8. The self-sealing dripper apparatus of claim 1, the piston further comprising an upper spindle having a first end and a second end, the first end of the upper spindle secured to the first end of the piston, the second end of the upper spindle extending at least partially into the dripper base and the aperture, wherein the upper spindle is configured to allow liquid from the liquid carrying pipe to flow past the upper spindle and through the aperture.

9. The self-sealing dripper apparatus of claim 8 wherein the upper spindle has a cross section that is less than circular allowing liquid from the liquid carrying pipe to flow around the upper spindle and through the aperture.

10. The self-sealing dripper apparatus of claim 1, the piston further comprising a lower spindle having a first end and a second end, the first end of the lower spindle secured to the second end of the piston, wherein the lower spindle extends through the second open end of the hollow piston casing.

11. The self-sealing dripper apparatus of claim 10 wherein the lower spindle is cylindrically shaped, and wherein liquid from the liquid carrying pipe flows around said lower spindle and through said second open end of the hollow piston casing when the second end of the piston is separated from the second open end of the hollow piston casing.

12. The self-sealing dripper apparatus of claim 10 and further comprising an O-ring located on the lower spindle and positioned between the second end of the piston and the open end of the hollow piston casing.

13. The self-sealing dripper apparatus of claim 10 and further comprising an external mass mounted to the second end of the lower spindle.

\* \* \* \* \*